United States Patent [19]

Hsueh

[11] Patent Number: 5,285,935

[45] Date of Patent: Feb. 15, 1994

[54] LUGGAGE CARRIER

[76] Inventor: Chin Y. Hsueh, 430, Ping Ho Road, Sec. 1, Nan Chen Village, Tien Wei Hsiang, Changhua, Taiwan

[21] Appl. No.: 9,213

[22] Filed: Jan. 26, 1993

[51] Int. Cl.5 .............................................. B62J 9/00
[52] U.S. Cl. .................................. 224/31; 224/32 R; 224/32 A; 224/33 R; 280/202
[58] Field of Search .................... 224/31, 32 R, 32 A, 224/33 R, 33 A, 36, 39, 40; 280/202; 297/243, 129

[56] References Cited

U.S. PATENT DOCUMENTS

| 615,756 | 12/1898 | Shackelton | 224/31 |
| 843,094 | 2/1907 | Paterson et al. | 280/202 |
| 2,436,991 | 3/1948 | Dirksen | 224/31 |
| 2,498,663 | 2/1950 | Easley | 224/33 R |

Primary Examiner—Linda J. Sholl
Attorney, Agent, or Firm—Thomas R. Vigil

[57] ABSTRACT

Disclosed is a luggage carrier having two side panels pivoted to a horizontal bottom panel thereof between a vertical front panel and a vertical back panel, and a seat belt, wherein the side panels are respectively turned downwards and bilaterally suspended from the bottom panel for permitting a baby to be carried on the bottom panel and held steady by the seat belt; the side panels are respectively turned upwards and tied up by the seat belt to close two opposite side openings for permitting things to be held inside the luggage-carrier.

1 Claim, 5 Drawing Sheets

5,285,935

LUGGAGE CARRIER

BACKGROUND OF THE INVENTION

1. Field of the Invention

The present invention relates luggage carriers, and more particularly to a luggage carrier which can be conveniently fastened to a bicycle or motorcycle and then alternatively arranged into either of two different forms for carrying a baby or things.

2. Description of Prior Art

A bicycle may be fastened with a luggage-carrier above the front or rear wheel thereof for carrying things. This luggage-carrier is suitable for carrying small things. Some people may also use the luggage-carrier of a bicycle to carry a baby or young child. Because the luggage-carrier on an ordinary bicycle is designed for carrying things only, it is neither safe nor comfortable to carry a baby or child on the luggage-carrier of a bicycle.

SUMMARY OF THE INVENTION

One object of the present invention is to provide a luggage-carrier which can be alternatively arranged into either of two forms for carrying things or a baby. Another object of the present invention is to provide a luggage-carrier which is safe in use to carry a baby. Still another object of the present invention is to provide a luggage-carrier which can be conveniently fastened to a bicycle or motorcycle for carrying things or a baby.

According to one aspect of the present invention, the luggage-carrier comprises a horizontal bottom panel, a vertical front panel and a vertical back panel respectively raised from the horizontal bottom panel at two opposite ends, two side panels respectively pivoted to the horizontal bottom panel and turned to close or open two opposite side openings between the vertical front panel and the vertical back panel, a horizontal front hand-rail on the vertical front panel, a seat belt fastened to the vertical back panel at two opposite sides, two bottom struts spaced on the bottom panel, which have holes and hooks and by which the luggage-carrier can be fastened to a bicycle above its rear wheel, two footrests and two back guards respectively pivoted to the side panels at two adjacent sides, and a back strut vertical on the vertical back panel, which has holes and by which the luggage-carrier can be fastened to a bicycle or motorcycle above its front wheel.

According to another aspect of the present invention, the side panels can be respectively turned downwards and bilaterally suspended from the vertical bottom panel for permitting a baby to be carried on the bottom panel and held steady by the seat belt; the side panels can be respectively turned upwards and tied up by the seat belt to close the two opposite side openings for permitting things to be held inside the luggage-carrier.

BRIEF DESCRIPTION OF THE DRAWINGS

The foregoing and other objects, features and advantages of the present invention will be best understood from the following description, the appended claims and the accompanying drawings in which:

DETAILED DESCRIPTION OF THE PREFERRED EMBODIMENT

Figure 1:
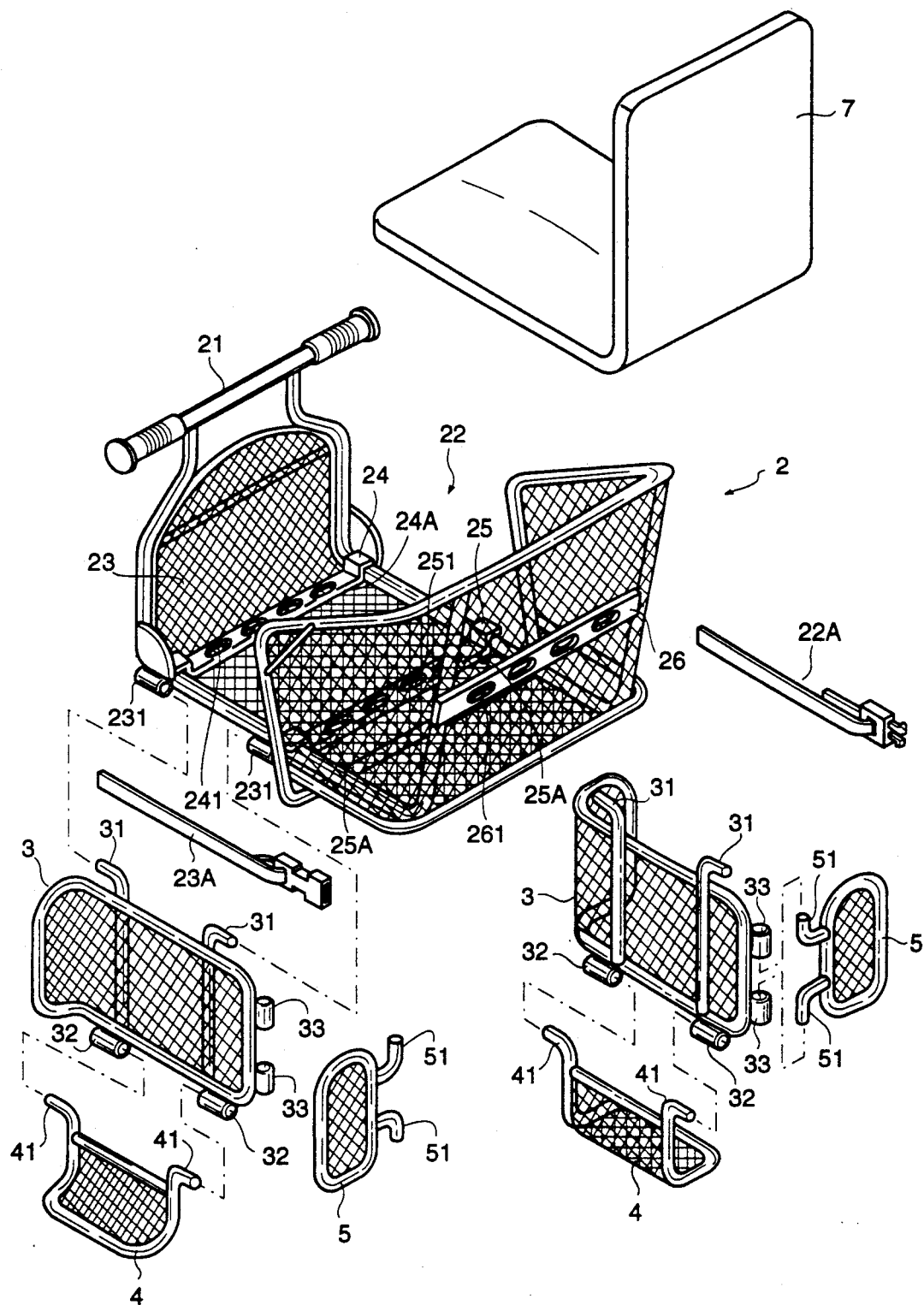
FIG. 1 is an exploded view of a carrier according the present invention.
Figure 1A:
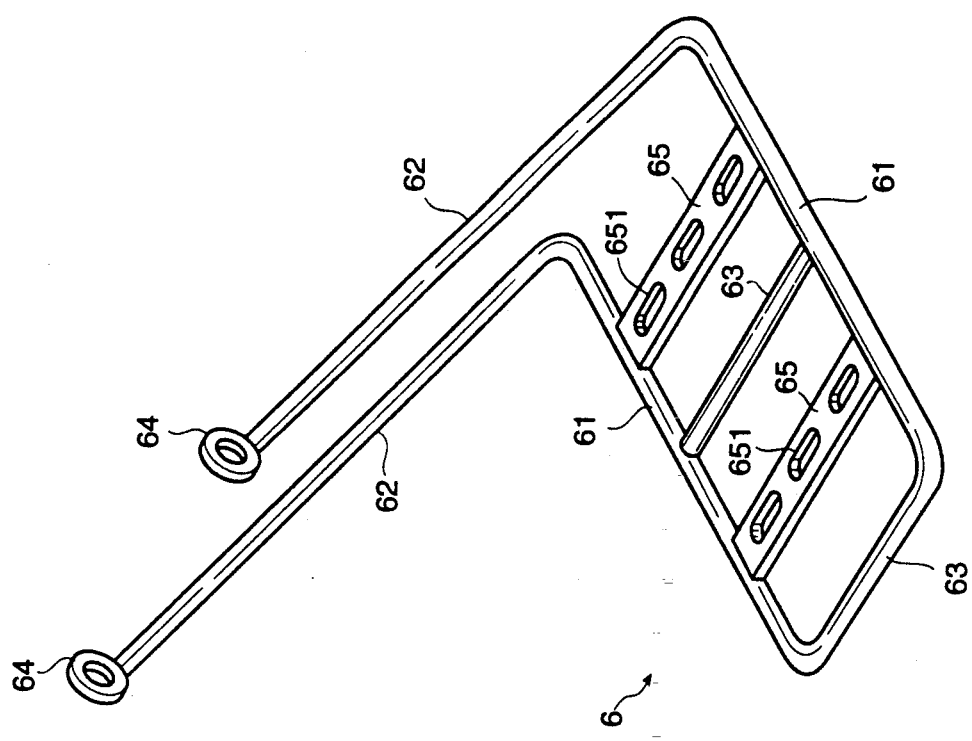
FIG. 1A is a luggage carrying frame according to the present invention.
Figure 2:
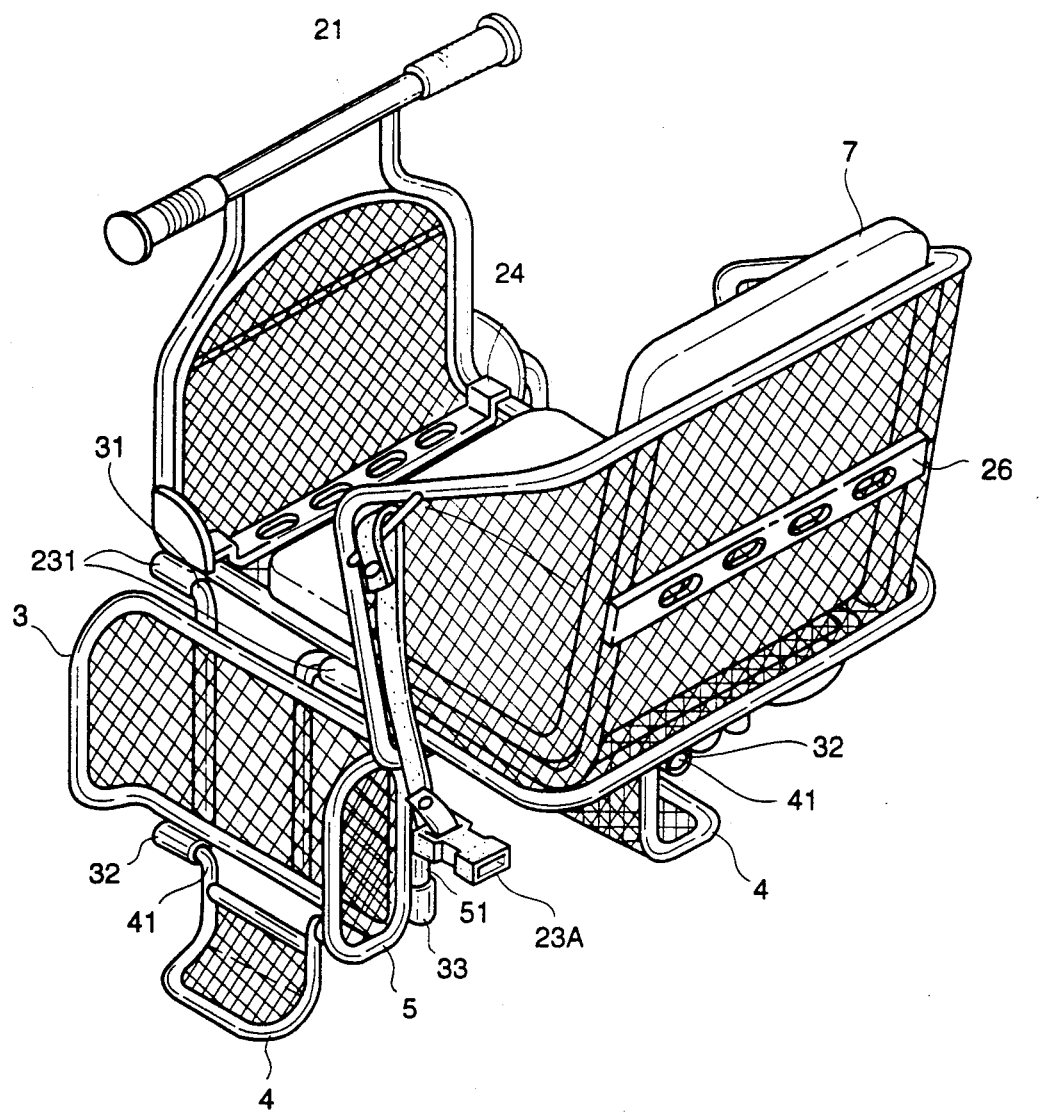
FIG. 2 is an elevational view of the carrier of FIG. 1.

Referring to FIGS. 1, 2,3 and 4, therein illustrated is a luggage carrier assembly in accordance with the present invention which is generally comprised of a luggage carrying frame 6 fastened to a bicycle above its front or rear wheel, a carrier 2 supported on the luggage carrying frame 6, and a cushion 7 put in the carrier 2 for sitting a baby. The carrier 2 comprises a horizontal front hand-rail 21 on the front panel thereof, a seat belt, namey, the strap with latch 22A and the strap with latch release 23A at two opposite sides, two pairs of opposite horizontal bottom barrels 231 respectively and horizontally disposed at the bottom of two opposite side openings 22,23 thereof, two side panels 3 respectively connected to the horizontal barrels 231 at two opposite sides by connecting rods 31, two footrests 4 respectively connected to the horizontal bottom barrels 32 on the side panels 3 by connecting rods 41, two back guards 5 respectively connected to the vertical barrels 33 on the side panels 3 by connecting rods 51, two bottom struts 24,25 spaced on the bottom panel thereof, and a back strut 26 on the back panel thereof, wherein the strut 24,25 or 26 has a series of holes 241, 251 or 261 aligned longitudinally; the strut 24 or 25 has hooks 24A or 25A on two opposite ends thereof. When connected, the side panels 3 can be turned on the horizontal bottom barrels 231 within 180°, the footrest 4 can be turned on the horizontal bottom barrels 32 on either side panel 3 within 90°, and the back guard 5 can be turned on the vertical barrels 33 on either side panel 3 within 90°. The luggage carrying frame 6 comprises two parallel rods 61 joined by cross rods 63, two bevel rods 62 spaced respectively and obliquely extended from the parallel rods 61, and two struts 65 with holes 651 supported between the parallel rods 61. The bevel rods 61 are respectively terminated to locating rings 64 connected to the wheel hub 11 of the front or rear wheel 12 of a bicycle 1.

Figure 3:
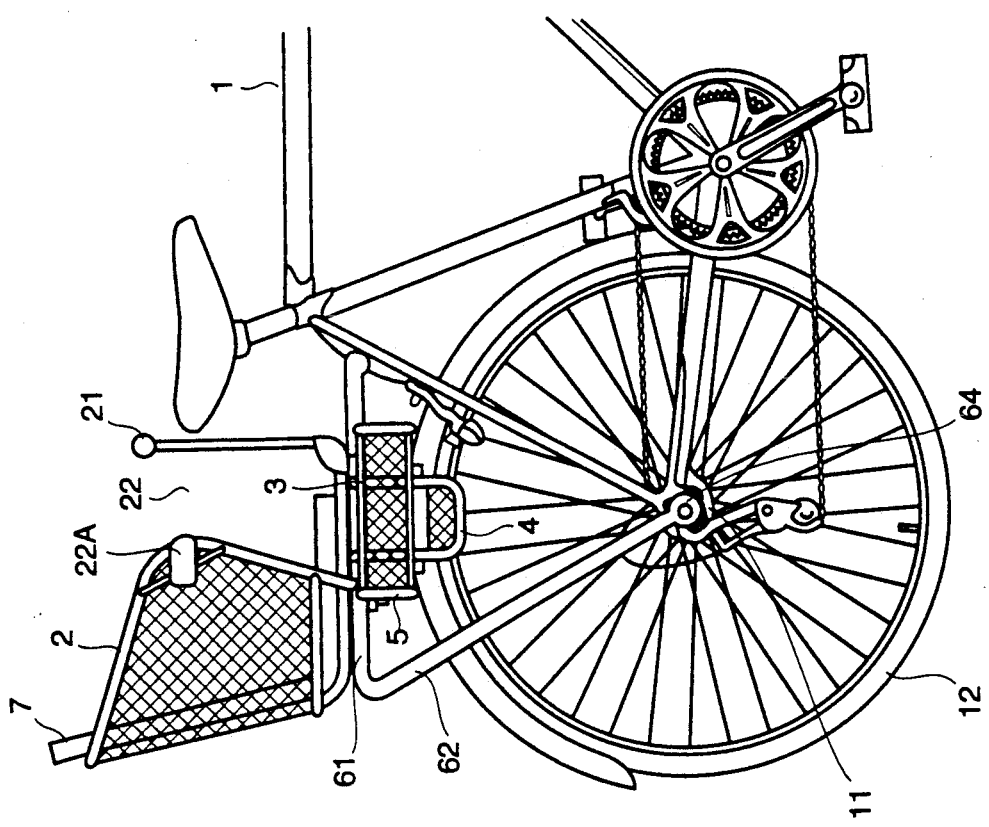
FIG. 3 illustrates the carrier arranged into a baby carrier supported on the luggage carrying frame fastened to the seat stays of a bicycle for carrying a baby.

Referring to FIG. 3, after the luggage carrying frame 6 has been fastened to the wheel hub 11 of the rear wheel 12 of a bicycle 1 with the parallel rods 61 connected to the seat stays of the bicycle 1, the carrier 2 is then fastened to the luggage carrying frame 6 at the top by hooking the hooks 24A,25A of the struts 24,25 on the cross rods 63 for permitting the holes 241,251 on the bottom struts 24,25 to be respectively aligned with the holes 651 on the struts 65 and respectively connected together by bolts 2A. When set, the side panels 3 with the footrests 4 and the back guards 5 are respectively turned downwards and suspended from the horizontal barrels 231 so that the luggage carrier assembly serves as a baby carrier for carrying a baby or young child. After a baby or young child has been put on the cushion 7 inside the carrier 2, the seat belt 22A,23A is fastened up to hold the baby or young child steady in the carrier 2.

Figure 4:
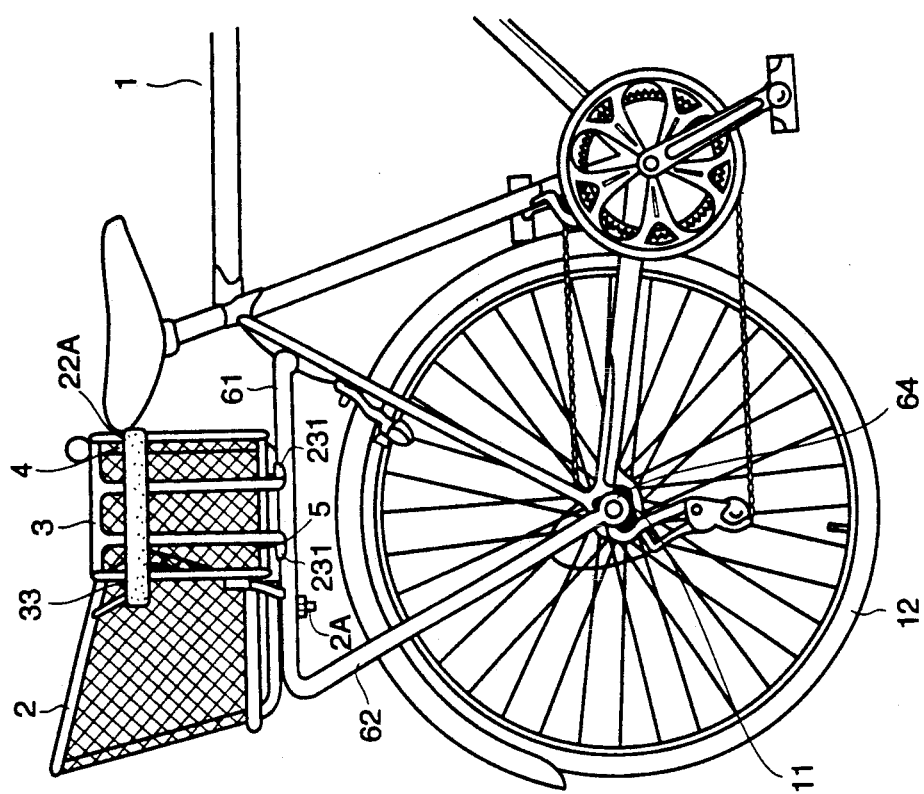
FIG. 4 illustrates the carrier arranged into a luggage carrier supported on the luggage carrying frame fastened to the seat stays of a bicycle for carrying things.

Referring to FIG. 4, the side panels 3 are respectively turned upwards through 180° to close the side openings 22,23, and the footrests 4 and the back guards 5 are respectively turned inwards through 90° and received inside the carrier 2, and then the strap with latch 22A and the strap with latch release 23A are used to tie up the side panels 3 in place, and therefore the luggage carrier assembly is used for carrying things.

Figure 5:
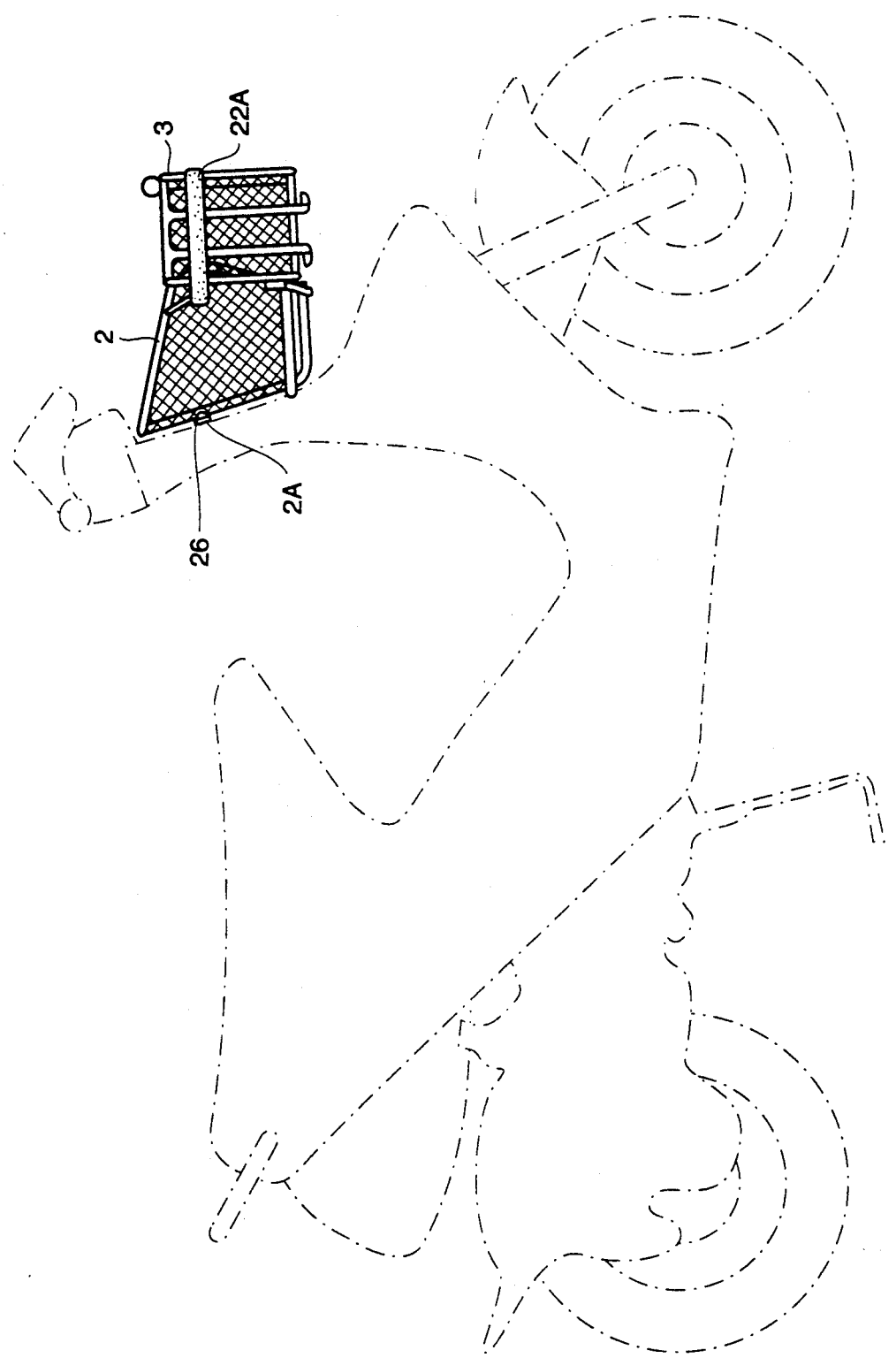
FIG. 5 illustrates the carrier arranged into a luggage carrier fastened to the fork cover of a scooter.

Referring to FIG. 5, the carrier 2 may be separately used and fastened to a scooter or motorcycle by threading bolts 2A through the holes 261 on the back strut 26 into holes (not shown) on the fork cover or front frame 10 of the scooter or motorcycle.

What is claimed is:

1. A luggage-carrier comprising a horizontal bottom panel, a vertical front panel raised from said horizontal bottom panel at one end, a vertical back panel raised from said horizontal bottom panel at an opposite end, two opposite side openings between said vertical front panel and said vertical back panel, a horizontal front hand-rail on said vertical front panel for grasping with the hand, a seat belt fastened to said vertical back panel at two opposite sides, two side panels respectively pivoted to said bottom panel at two opposite sides and moved to close or open said two side openings respectively, two bottom struts spaced on said bottom panel, said bottom struts having holes and hooks for fastening the luggage-carrier to a bicycle above its rear wheel, two foot rests and two back guards respectively pivoted to said side panels at two adjacent sides, and a back strut on said vertical back panel, said back strut having holes for fastening the luggage-carrier to a bicycle or motorcycle above its front wheel, wherein said side panels are respectively turned downwards and bilaterally suspended from said bottom panel for permitting a baby to be carried on said bottom panel and held steady by said seat belt; said side panels are respectively turned upwards and tied up by said seat belt to close said two opposite side openings for permitting things to be held inside the luggage-carrier.

* * * * *